Sept. 7, 1943.  E. A. DROTT  2,328,715
EXCAVATOR
Filed Sept. 24, 1941   3 Sheets-Sheet 1
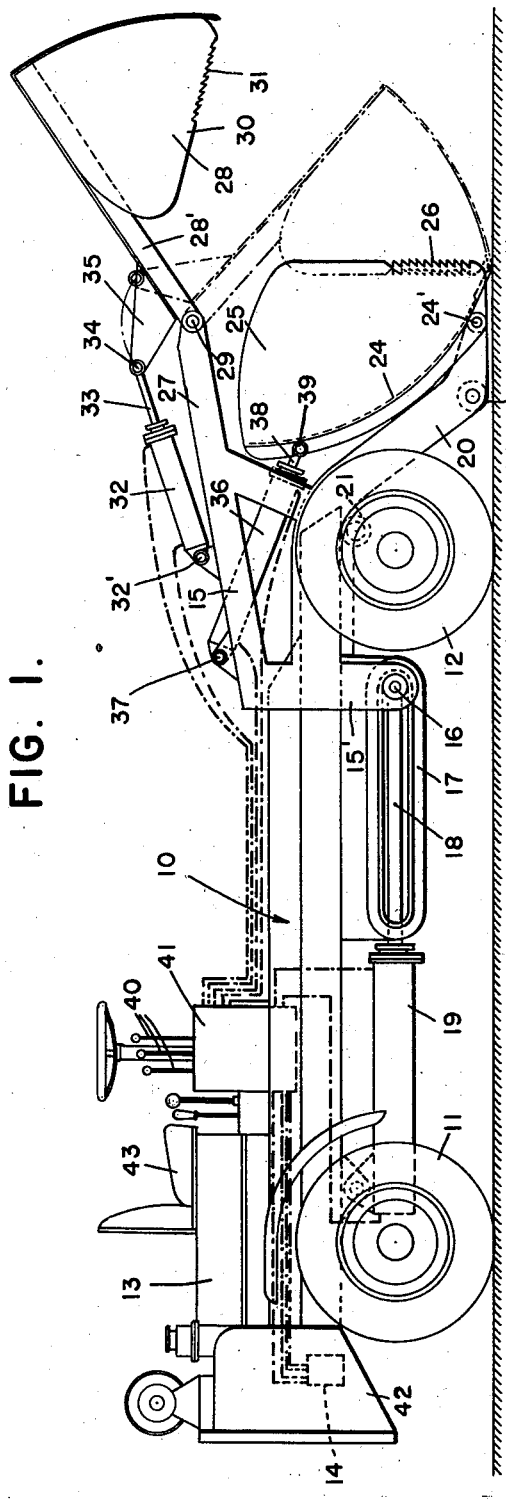
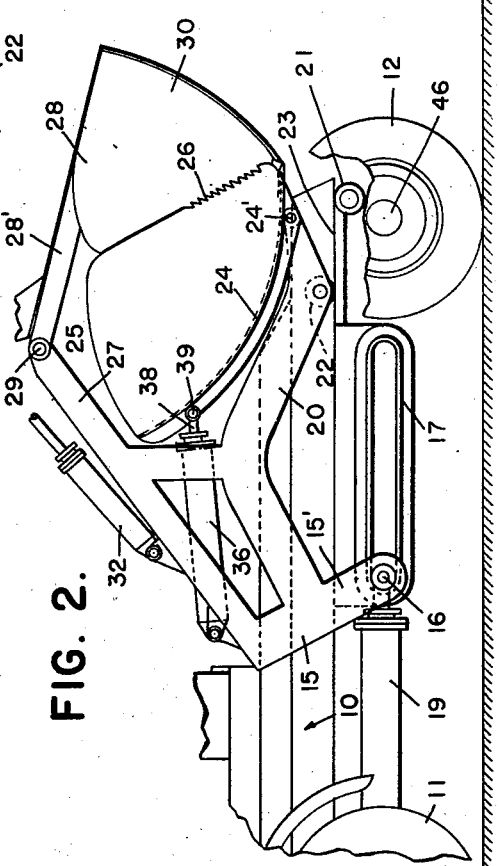
INVENTOR
EDWARD A. DROTT
BY
Louis O. French
ATTORNEY

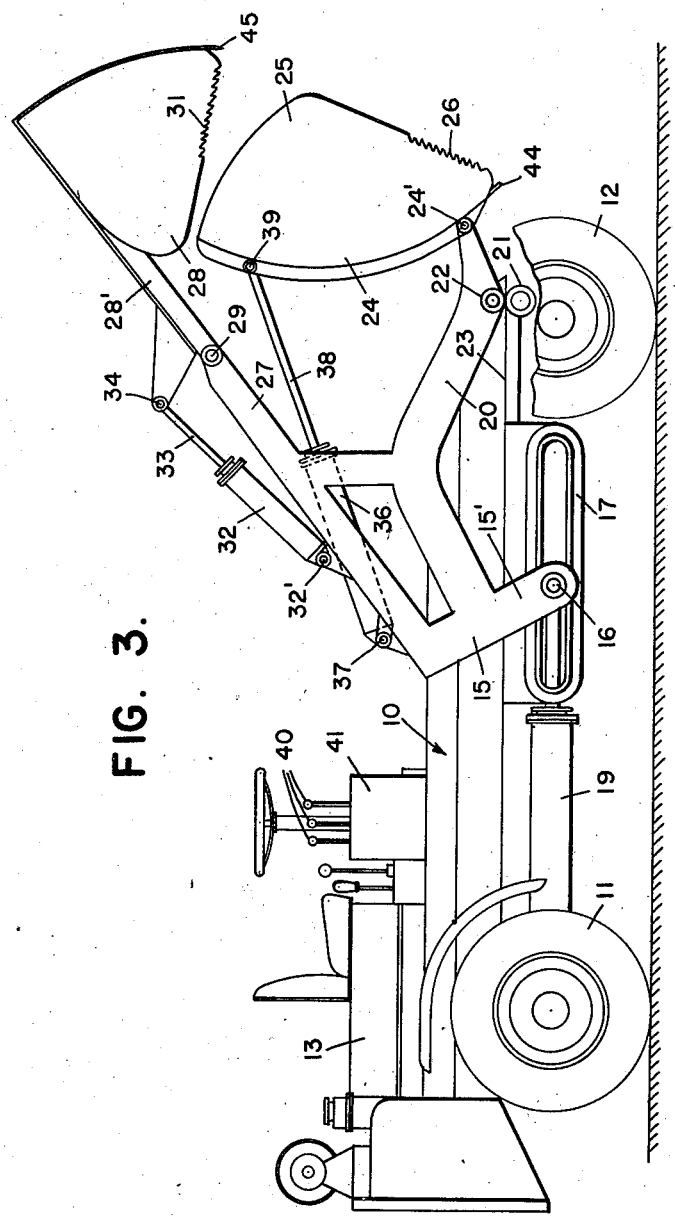

Sept. 7, 1943.                E. A. DROTT                    2,328,715
                                EXCAVATOR
                         Filed Sept. 24, 1941            3 Sheets-Sheet 3

INVENTOR
EDWARD A. DROTT

BY
*Louis O. French*
ATTORNEY

Patented Sept. 7, 1943

2,328,715

UNITED STATES PATENT OFFICE 2,328,715

EXCAVATOR

Edward A. Drott, Milwaukee, Wis., assignor to Hi-Way Service Corporation, Milwaukee, Wis., a corporation of Wisconsin Application September 24 1941, Serial No. 412,086

5 Claims. (Cl. 37—126)

The invention relates to material handling apparatus.

The general object of the invention is to provide a heavy duty material handling apparatus having a wide variety of uses in the excavating and moving of earth or other bulky material and in the carrying and handling of logs, large stones, and other objects and materials.

According to the present invention, the apparatus embodies a tiltable bulldozer or plow structure which is cooperatively associated with a bucket, scoop, or gripper member so as to transport material between them, the plow structure and scoop member being mounted on a movable frame or carrying means by which the load is shifted to a position over or between the wheels or traction elements of the propelling vehicle and adapted to be dumped from an elevated position at one end of the vehicle.

The invention further consists in the several features hereinafter set forth and more particularly defined by claims at the conclusion hereof.

In the drawings:

Fig. 1 is a side elevation view of an apparatus embodying the invention showing it in full in a digging position;

Fig. 2 is a view of the apparatus similar to Fig. 1 showing it in a load carrying position, parts being broken away;

Fig. 3 is a view similar to Fig. 1 showing the apparatus in a dumping position;

Figure 6:
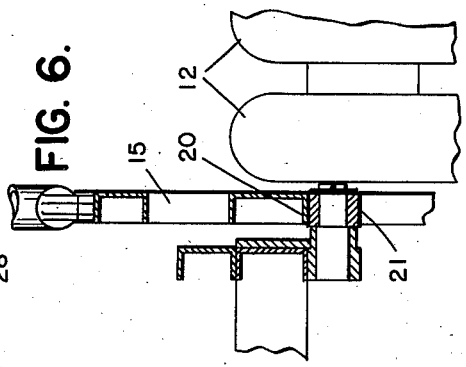
Fig. 6 is a detail sectional view taken on the line 6—6 of Fig. 4.
Figure 4:
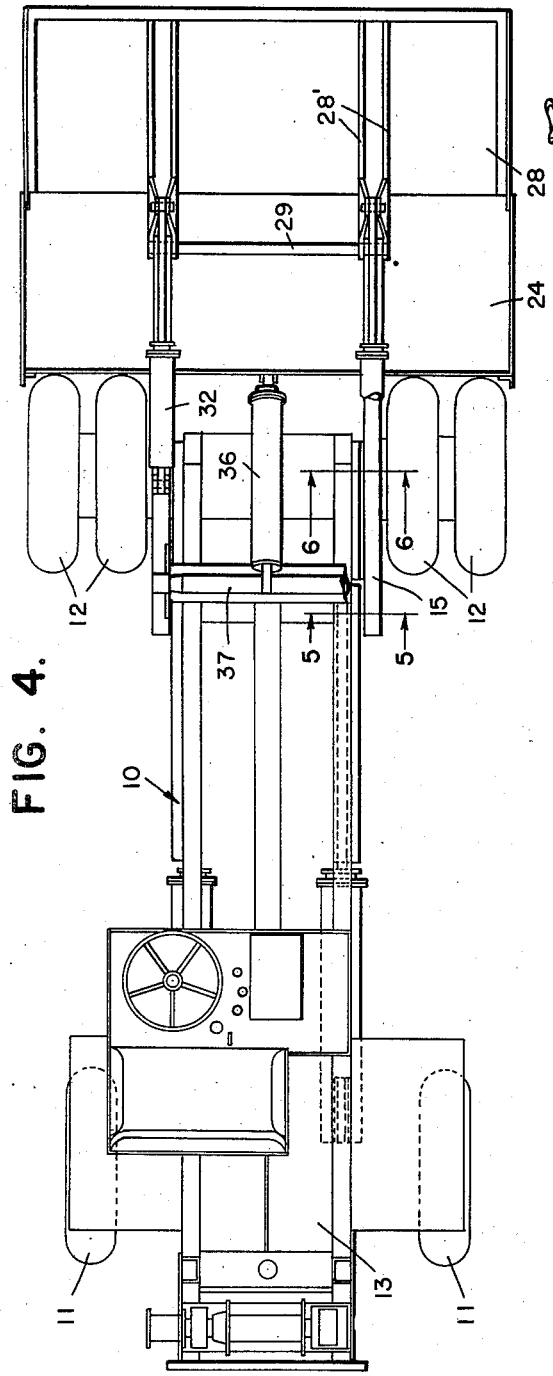
Fig. 4 is a plan view of apparatus embodying the invention.
Figure 5:
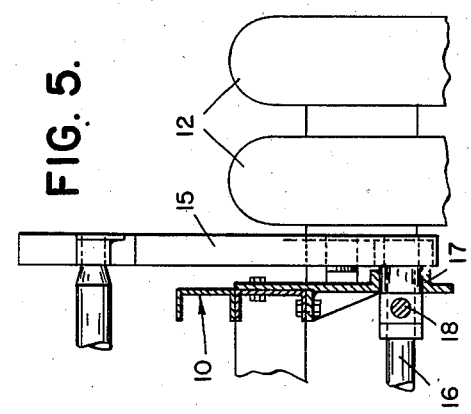
Fig. 5 is a detail sectional view taken on the line 5—5 of Fig. 4.

In the drawings, the numeral 10 designates generally a motor driven vehicle here shown as a wheeled truck type vehicle having dirigible front wheels 11 and rear propelling wheels 12 suitably connected to a suitable power plant 13 which also drives an hydraulic pump unit 14 of suitable construction.

An implement carrying frame is formed by interconnected side frame parts 15, each of which has a part 15' disposed adjacent the vehicle frame and connected to the other by a transverse shaft 16 which is slidably mounted in lengthwise extending stationary frame guides 17 fixedly secured to the vehicle frame. Adjacent each frame part 15 the shaft 16 is connected to piston rod 18 of a double acting piston operating in an hydraulically charged cylinder 19 carried by the vehicle frame. The parts 15 include inclined arm portions 20 whose inclined inner sides are adapted to ride on a roller 21 pivotally mounted at each side of the machine. The arm portions 20 each have a roller 22 mounted thereon at their lower ends which is adapted to ride on a straight track 23 when the carrying frame is in an elevated position. The outer ends of the arm portions 20 have a curved moldboard or bulldozer structure 24 pivotally secured thereto adjacent its lower edge by pins 24'. This bulldozer or plow structure also has side plates 25 secured thereto and provided with gripper jaw portions 26. The curvature of the plow blade may be such as to form with the side plates 25 a scoop member extending transversely of one end of the vehicle, preferably the rear end thereof.

The side frame parts 15 also have upper outwardly extending arm portions 27 to which the spaced arms 28' of a bucket or scoop member 28 are pivotally secured by pins 29. The scoop member 28 has side plates 30 provided with gripper jaw portions 31 adapted to cooperate with the jaw portions 26 of the bulldozer or plow structure above described.

Each side frame part 15 has one end of a hydraulic cylinder 32 pivotally connected thereto at 32', and the piston working in said cylinder has its rod 33 pivotally connected at 34 to a bracket 35 on the arm 28' of the scoop member. The hydraulic motor formed by the cylinder 32 and its piston is double acting, so that the scoop member is positively moved hydraulically in either direction and may be held in any desired adjusted position. The hydraulic motor being mounted on the frame carrying the scoop member, the scoop member may be swung to any desired angular position relative to the frame.

The plow structure may be swung about its lower supporting pivots relative to its carrying frame by a hydraulic motor comprising a hydraulic cylinder 36 pivotally connected at one end to the central portion of a transversely disposed shaft 37 connecting the frame parts 15 and having a piston working in it whose rod 38 is pivotally connected at 39 to the upper end of the plow 24. The movement of the plow 34 under the action of the hydraulically operated motor means above described may occur independent of the position or movement of its carrying frame, and by it the angularity of the plow 24 may be adjusted to vary its digging action or to move said plow to a material discharge or dumping position or to hold said plow in any desired adjusted position.

Control levers 40 control the operation of control valve mechanism 41 which controls the flow of hydraulic fluid to the hydraulic cylinders 19, 32, and 36 to reciprocate or hold steady the pistons working therein.

The front end of the vehicle may have a counterweight structure 42 mounted thereon to counterbalance the weight of the load taken on at the rear end of the vehicle.

An operator's seat 43 is shown facing toward the rear of the vehicle which becomes the front or advance end during digging with the steering accomplished by the wheels 11 then located at the rear of the vehicle. Transportation of the load may be accomplished while the vehicle is travelling in either direction.

With the above construction, for excavating material the plow 24 is lowered to bring its lower cutting edge 44 to the desired depth for digging, and this may be determined by the movement of the carrying frame including the parts 15 to the desired vertical position relative to the vehicle frame. This movement is affected by the operation of the hydraulic cylinders 19 and rods 18, it being noted that as the rods 18 pull the frame parts 15 forwardly that the inclined portions thereof will ride up on the rollers 21. The digging angle of the edge or blade 44 is determined by the angular adjustment of the plow 24 relative to its carrying frame and the terrain over which it is working, and this adjustment may vary the digging depth to some extent. With the plow 24 in the desired operating position the vehicle is propelled backwardly pushing the plow into the material to be excavated and stripping off a layer thereof which follows or piles up on the moldboard as it is cut and then cascades rearwardly and is prevented from falling back onto the terrain, from which it was removed, by bringing and holding the scoop member 28 in a position in front of and above the digging edge 44 of the plow, which position would be above the dotted line shown in Fig. 1. The excavated material is thus retained in the cavity formed between the plow 24 and scoop 28. Thereafter, the scoop member 28 may be swung down to bring its cutting edge 45 into closing association with the plow 24 as shown in dotted lines in Fig. 1. Then the load between the plow 24 and scoop 30 may be raised and moved forwardly relative to the vehicle frame to the position shown in Fig. 2 by the forward movement of the rods 18 under the action of hydraulic fluid introduced in the rear ends of the cylinders 19. During this movement the load is first raised above the axle 46 for the rear wheels, and then the rollers 22 ride along the tracks 23 to bring the load between the front and rear wheel supports of the vehicle, so that the center of gravity will be within the area of the vehicle over or between its wheels or other carriers.

With the load thus mounted on the vehicle as shown in Fig. 2, the vehicle may be driven to any desired place for the discharge of the load, and then by the moving of the scoop 28 to an open position as shown in Fig. 3 by its upward swinging under the action of the rods 33 and then by the forward swinging of the plow 24 about its pivots 24' by the forward movement of the rod 38 under the action of the piston operating in the cylinder 36 the load is allowed to fall to the place of deposit by gravity.

For removing large boulders, the boulder may be pushed onto the moldboard of the plow 24 by the movement of the vehicle as in digging, and then the scoop member 28 may be swung down to grip the boulder on the opposite side from that of the plow, and then the loaded plow and scoop member may be raised to a position above the rear axle and inside the wheel supported area of the vehicle and transported to the place of deposit, and then the boulder may be discharged from the vehicle by the upward release movement of the scoop member 28 and the forward swinging movement of the plow 24.

For carrying timbers, logs, steel bars, and other bulk material, the scoop member 28 and plow structure 24 may be manipulated like a pair of big pinchers with spaced sets of jaws 26, 31 and the gripped article be hoisted up onto the vehicle by the movement of the carrying frame including the frame parts 15 and may thereafter be lowered by the reverse movement of said carrying frame and the scoop member 28 swung outwardly to release the article from between it and said plow 24.

I desire it to be understood that this invention is not to be limited to any particular form or arrangement of parts except in so far as such limitations are included in the claims.

What I claim as my invention is:

1. In a material handling apparatus, the combination with a vehicle having traction elements, of a movable carrier mounted on said vehicle, a bulldozer structure pivotally mounted at its lower end on said carrier and adapted to project from one end of the vehicle, means for moving said carrier relative to the vehicle to bring said bulldozer structure from a digging position at one end of the vehicle to a carrying position within the load sustaining area between the traction elements of the vehicle, and a scoop member pivotally connected at its upper end to said carrier and cooperating with said bulldozer structure to retain material therein, and means mounted on said carrier for moving said scoop member.

2. In a material handling apparatus, the combination with a vehicle having traction elements, of a movable carrier mounted on said vehicle, a bulldozer structure pivotally mounted at its lower end on said carrier and adapted to project from one end of the vehicle, means for moving said carrier relative to the vehicle to bring said bulldozer structure from a digging position at one end of the vehicle to a carrying position within the load sustaining area between the traction elements of the vehicle, and a scoop member pivotally connected at its upper end to said carrier and cooperating with said bulldozer structure to retain material therein, means mounted on said carrier for moving said scoop member, and means mounted on said carrier for angularly shifting the position of said bulldozer structure.

3. In a material handling apparatus, the combination with a vehicle having traction elements, of a carrier mounted on the vehicle for lengthwise and swinging movements relative thereto, hydraulically operated means for moving said carrier, a bulldozer structure pivotally mounted at its lower portion upon said carrier and tiltable relative thereto, hydraulically operated means mounted on said carrier for tilting said bulldozer, the movement of said carrier adapted to move the bulldozer structure from a digging position at one end of the vehicle to a load carrying position over one of the traction elements of the vehicle, a scoop member pivotally mounted on said carrier and cooperating with said bulldozer structure to retain the load therein, means for moving said scoop member relative to said bulldozer, said means for moving said scoop member and said means for swinging said bulldozer structure relative to said carrier being effective when said bulldozer is in a carrying position to discharge the load from an elevated position relative to the vehicle.

4. In a material handling apparatus, the combination with a vehicle having traction elements, of a carrier mounted on the vehicle for lengthwise and swinging movements relative thereto, hydraulically operated means for moving said carrier, a bulldozer structure pivotally mounted at its lower portion upon said carrier and tiltable relative thereto, hydraulically operated means mounted on said carrier for tilting said bulldozer, the movement of said carrier adapted to move the bulldozer structure from a digging position at one end of the vehicle to a load carrying position over one of the traction elements of the vehicle, a scoop member pivotally mounted on said carrier and cooperating with said bulldozer structure to retain the load therein, hydraulically operated means carried by the carrier for moving the scoop member, said means for moving said scoop member and said means for swinging said bulldozer structure relative to said carrier being effective when said bulldozer is in a carrying position to discharge the load from an elevated position relative to the vehicle.

5. In a material handling apparatus, the combination with a vehicle having traction elements, of a carrier mounted on the vehicle for lengthwise and swinging movements relative thereto, means for moving said carrier, a bulldozer structure pivotally mounted at its lower portion upon said carrier and tiltable relative thereto, hydraulically operated means mounted on said carrier for tilting said bulldozer, the movement of said carrier adapted to move the bulldozer structure from a digging position at one end of the vehicle to a load carrying position over one of the traction elements of the vehicle, a scoop member pivotally mounted on said carrier and cooperating with said bulldozer structure to retain the load therein, means for moving said scoop member relative to said bulldozer, said means for moving said scoop member and said means for swinging said bulldozer structure relative to said carrier being effective when said bulldozer is in a carrying position to discharge the load from an elevated position relative to the vehicle.

EDWARD A. DROTT.